(12) United States Patent
do Amaral Assy et al.

(10) Patent No.: US 10,502,606 B2
(45) Date of Patent: Dec. 10, 2019

(54) WIRELESS PARTICULATE SOLID MATERIAL FLOW SENSOR WITH INTERNAL BATTERY

(71) Applicant: José Roberto do Amaral Assy, Municipio de Caldas Novas (BR)

(72) Inventors: José Roberto do Amaral Assy, Municipio de Caldas Novas (BR); Alexandre Leite Rosa, São Paulo (BR); Gustavo Baldon Torquato, São Paulo (BR); Ivanildo Batista Do Nascimento, São Paulo (BR); Rodrigo Tadeu De Oliveira Ladeira, São Paulo (BR); Silvio De Lacerda, São Paulo (BR)

(73) Assignee: José Roberto do Amaral Assy, Caldas Novas, GO (BR)

( * ) Notice: Subject to any disclaimer, the term of this patent is extended or adjusted under 35 U.S.C. 154(b) by 453 days.

(21) Appl. No.: 15/285,933

(22) Filed: Oct. 5, 2016

(65) Prior Publication Data
US 2017/0102259 A1   Apr. 13, 2017

(30) Foreign Application Priority Data
Oct. 9, 2015   (BR) .......................... 10 2015 025882

(51) Int. Cl.
| | | |
|---|---|---|
| G01F 1/66 | (2006.01) |
| G01F 15/00 | (2006.01) |
| A01C 7/10 | (2006.01) |
| G01F 1/76 | (2006.01) |
| G01F 15/06 | (2006.01) |
| G01F 15/075 | (2006.01) |

(52) U.S. Cl.
CPC ............ *G01F 15/001* (2013.01); *A01C 7/105* (2013.01); *G01F 1/666* (2013.01); *G01F 1/76* (2013.01); *G01F 15/063* (2013.01); *G01F 15/066* (2013.01); *G01F 15/075* (2013.01)

(58) Field of Classification Search
CPC ...................................... G01F 1/666
See application file for complete search history.

(56) References Cited

U.S. PATENT DOCUMENTS

| | | | | |
|---|---|---|---|---|
| 3,561,253 A | * | 2/1971 | Dorman ............... | G01N 29/036 310/312 |
| 4,057,709 A | * | 11/1977 | Lyngsgaard ........... | B65G 51/36 235/98 R |
| 4,079,362 A | | 3/1978 | Grimm et al. | |
| 4,238,790 A | | 12/1980 | Balogh et al. | |
| 4,441,101 A | | 4/1984 | Robar | |

(Continued)

FOREIGN PATENT DOCUMENTS

| | | |
|---|---|---|
| BR | 0201720 A | 3/2002 |
| BR | 0301241 A | 12/2004 |

(Continued)

*Primary Examiner* — Lisa M Caputo
*Assistant Examiner* — Alex T Devito
(74) *Attorney, Agent, or Firm* — FisherBroyles, LLP

(57) ABSTRACT

A robust low-cost wireless sensor with an internal battery, which permits operation for extended periods without the necessity of maintenance, for monitoring the flow of particulate solid material such as chemical fertilizers, small seeds, granulated foodstuffs, and others.

23 Claims, 12 Drawing Sheets

(56) References Cited

U.S. PATENT DOCUMENTS

| | | | |
|---|---|---|---|
| 4,732,663 A * | 3/1988 | Kato | G01N 27/4062 |
| | | | 204/426 |
| 5,831,539 A | 11/1998 | Thomas et al. | |
| 5,831,542 A | 11/1998 | Thomas et al. | |
| 7,450,019 B1 | 11/2008 | Spain | |
| 8,950,260 B2 | 2/2015 | Gelinske et al. | |
| 2006/0267756 A1 * | 11/2006 | Kates | G01N 33/0065 |
| | | | 340/521 |
| 2011/0300001 A1 * | 12/2011 | Murphy | A61M 5/14224 |
| | | | 417/1 |
| 2016/0042154 A1 * | 2/2016 | Goldberg | G06F 19/3418 |
| | | | 705/2 |

FOREIGN PATENT DOCUMENTS

| | | |
|---|---|---|
| BR | 0704828 A | 11/2007 |
| BR | 0923975 A | 9/2012 |

* cited by examiner

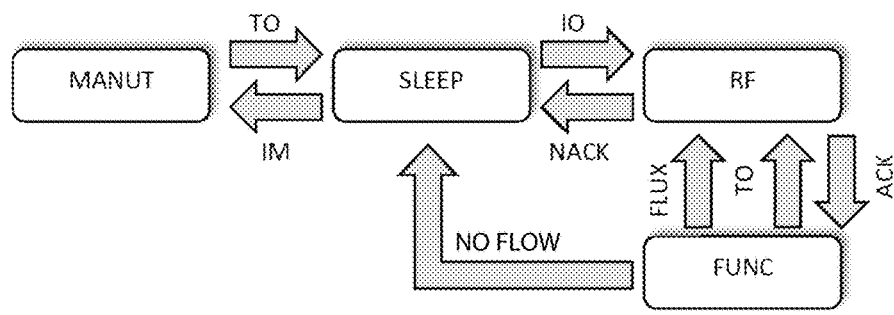

Operating modes

MANUT: Maintenance state

SLEEP: Standby
(very low power consumption)

RF: Communication with remote monitor
(high power consumption)

FUNC: Full operation mode
(intermediate power consumption)

Transitions

TO: Transition by predetermined time

IM: Transition by maintenance indicator signal

IO: Transition by operation indicator signal

ACK: Remote monitor on

NACK: Remote monitor off

FLOW: Flow alteration

NO FLOW: No flow for a long period of time

FIG. 11

WIRELESS PARTICULATE SOLID MATERIAL FLOW SENSOR WITH INTERNAL BATTERY

PRIORITY CLAIM

This application claims the benefit of the filing date of Brazilian Patent Application Serial No. BR 10 2015 025882 8, filed Oct. 9, 2015, for "Wireless Particulate Solid Material Flow Sensor With Internal Battery," the disclosure of which is incorporated herein by reference in its entirety.

TECHNICAL FIELD

This invention refers to a robust low-cost wireless sensor with an internal battery that permits operation for extended periods without the necessity of maintenance, for monitoring the flow of particulate solid material such as chemical fertilizers, small seeds, granulated foodstuffs, and others, where such flow is generated by mechanical action, gravity or by pneumatic pressure, as used in equipment or machines found in various sectors such as agriculture and livestock, foodstuffs, civil construction, plastics, etc., although mainly in agricultural machinery, the main purpose of which is to monitor flow within the conduits that conduct particulate material during the operation of equipment and/or machines, and to alert the operator where the flow is irregular or interrupted.

BACKGROUND

Flow sensors are widely used devices in various sectors of industry used for many purposes. Various types of sensors exist, such as air flow sensors, water flow sensors and particulate material flow sensors, etc.

Particularly in the agricultural sector with the growing need to produce increasingly higher grain yields, various methods and devices have come to be developed in order to improve the efficiency and accuracy of the application of seeds and inputs in the field. Due to this, flow sensors are one of the devices used in agricultural machinery with the objective of monitoring the flow of seed and/or inputs that are applied in the planting area.

One of the disadvantages presented by such flow sensors is related to the fact that they are sensitive to the accumulation of dust due to the downward movement of seeds and/or inputs in the conduits of agricultural machines, which leads to sensors functioning incorrectly.

Another apparent disadvantage is the fact that sensors send data to operator control interfaces, whether monitors or on-board computers, by means of wires routed through agricultural machinery, which are a constant source of faults and failures.

Furthermore, another apparent drawback is the fact that sensors require a level of power that makes it necessary for the power supply to be fed by means of wires connected to batteries or generators, which are also a source of faults and failures.

Listed below are some state-of-the-art technical documents and their disadvantages.

Patent document BR PI0301241-7 concerns an intelligent seed and fertilizer sensor, in particular, a current and voltage sensor, used to "detect" demand for seeds and fertilizer in mechanized distribution units, making it possible to determine whether or not the product is coming out of each containment vessel, as used in multi-line distribution machines, in order to avoid non-homogeneous distribution in a particular line, compromising the quality of planting.

One of the disadvantages presented by the system described above resides in the fact that the optical sensor exhibits reading failures due to the volume of dust generated by the flow of seeds and/or fertilizer within the conduit.

Patent document BR PI0704828-9 concerns an optical and/or ultrasonic reading system applied in planters for monitoring the outflow of seeds and fertilizers in which an optical or ultrasonic sensor is positioned between a semiconductor and the seed conductor within the main body and next to the individual reservoir, featuring an optical or ultrasonic sensor close to the blade or double plough disc of fertilizers and between the fertilizer conductor and the sleeve, in which the sensors have signal transmitters and receptors placed within a housing and protected by transparent plaques configured in such a way as to emit rays and occupy the entire space of the section for the passage of products.

The optical and/or ultrasonic reading system described in the above document diverges frontally from that as recommended by the sensor subject to the present invention due to the use of an optical and/or ultrasonic sensor. In addition, such detection technologies are also greatly affected by the layers of material deposited above the sensors within the conduit.

Patent document BR PI0923975-8 describes a microprocessor-controlled method and system used to detect the presence of solid inputs, basically comprised of a main capacitive sensor, microcontrollers and other devices whereas the system processes the data measured and emits signals to various external devices, such as light-emitting diodes (LEDs), sirens, on-board computers, machine control panels and wireless signal receptors. This system uses specific methods to create detection parameters that, in addition to detecting solid inputs, also eliminates the possibility of false alarms that arise from the presence of small layers of dirt, such as dust or fertilizer crusts that eventually may come to be deposited on the sensors and that are normally detected by the sensors as an input stream and not as dirt deposited on the sensor.

The system and method used for the detection of solid inputs by way of capacitive sensors, as described in the aforementioned document, presents some drawbacks, among which are highlighted the requirement for wires to supply the sensors with a power feed, due to their high energy consumption.

Patent document BR PI0201720-2 describes a solid mass flow sensor that provides for the perfect monitoring of solid mass flows and even indicates when the system is clogged up. Its application is for the monitoring of any solid mass flow, independent of granulation or texture, and for any solid mass applicator equipment. Its use is particularly for, although not limited to, the monitoring of fertilizer solid flows being provided with a transducer, which may be a microphone, buzzer or any type of vibration or sound pick-up. This transducer can directly intercept the mass flow, be coupled externally or internally to the conduit that carries the mass flow, can be simply close to the mass flow or can be laid alongside or close to cords that intercept the mass flow and transmit vibrations or sound to the transducer. The transducer then captures the vibrations or sounds and transforms them into electrical signals that are amplified and filtered and turned into electronic signals, such are then conducted to a control panel, which includes a calibrator button via that the operator will control the ideal conditions for the mass flow and that may also contain LEDs or displays to inform the operator about the conditions of the mass flow.

The flow sensor described in the above document presents some drawbacks among which are highlighted the absence of a resonate element installed in the conduit that guides the particulate material, to enhance the pick-up of mechanical vibrations due to collisions between particles within the flow and the conduit. Another deficiency in the technique as described in the above document resides in the fact that the transducer is not provided with a shield so as to impede incidences of external vibrations, which can result in malfunctioning of the transducer.

The initial proposal for a solid fertilizer flow sensor, such as described in the patent document PI0201720-2, resulted in the development of a wireless particulate solid materials flow sensor, the subject of this invention, the main purpose of which is to monitor the flow of particulate material within a tubular conduit during operation of equipment and/or machinery and that alerts the operator when the flow is irregular or interrupted.

Patent documents U.S. Pat. Nos. 5,831,539 and 5,831,542 describe a specialized sensor for the flow of seeds, provided with a passive piezoelectric type transducer inserted at an angle within a tubular conduit for seeds, in such a way that seeds collide directly with the transducer at an angle that captures the vibrations of such collisions.

Patent document U.S. Pat. No. 4,441,101 describes a specialized sensor for the flow of seeds that consists of a pin with one end coupled to a piezoelectric transducer. The other end of the pin is positioned internally to the seed flow conduit in such a way that vibrations that originate from collisions between the pin and seeds are captured by the piezoelectric transducer.

Patent document U.S. Pat. No. 4,079,362 describes a specialized sensor for the flow of seeds and fertilizers fed by gravity in which a piezoelectric transducer is positioned in the path of the falling particulate material, in such a way that the particulate material directly impacts the transducer, thereby generating an electrical signal in response to collisions between the material and the transducer.

The flow sensors described in the aforementioned documents present some drawbacks, among which are highlighted the fact that such sensing methods are done in an invasive manner, that is to say, the transducer itself interrupts the flow of seeds, thereby causing disturbance within the flow and mechanical damage to the seeds. This effect is more pronounced in systems that generate flow by way of air pressure where the material travels through conduits at high speed.

Additionally, invasive flow sensing is handicapped due to the fact that dirt, dust and chemical treatments present among seeds are deposited on the transducers or on the walls that support such, reducing efficiency and reliability. This disadvantage compromises the sensing of fertilizer solid flows even more, given that in the presence of humidity, the particulate material may be deposited and adhere to the transducer or on the walls that support such, a phenomenon known as crusting, which prejudices their function.

Patent document US 07450019B1 describes a flow sensor for material transported by pneumatic pressure, provided with a piezoelectric transducer coupled to a flow deflector that captures vibrations that originated from the collision between particulate material and the deflector.

The flow sensor described in the aforementioned document presents some drawbacks, among which we highlight the fact that the sensor is applied to a specific material dosing system supplied with a deflector. Additionally, deposition of material on the deflector can prejudice the detection of vibrations. In addition, there is the further disadvantage of not having any type of protection or isolation for the transducer-deflector assembly which is subject to the erroneous capture of vibrations that arise from the structure of the machine and from external impacts.

Patent document US 08950260B2 describes a flow sensor for seeds fed by pneumatic pressure. The sensor is provided with a curved conduit in which an acoustic transducer is coupled which generates sound waves in response to collisions from seeds with the transducer, whereas these sonic waves are transported via a duct to an electromechanical transducer which transforms sound into electrical signals for later processing.

The flow sensor described in the aforementioned document presents some drawbacks, among which we highlight the fact that the sensor imposes an abrupt change in the direction of flow which generates pressure drops in the pneumatic system and thereby leads to damage to seeds and any treatments applied to them. Furthermore, the geometry of the system favors the deposition of material in front of the acoustic transducer, such as dust, dirt, and chemical treatments among others which prejudices its function. Additionally, it contains a series of rubber tubes placed in each sensor which burdens the product making it difficult to install and which can lead to the need for maintenance. Another drawback is the need for an external energy supply for the system to function which in itself leads to the need to accommodate cables for agricultural equipment with all the known problems associated with this type of solution.

Patent document US 04057709 describes a flow sensor for seeds transported by pneumatic pressure or by gravity, provided with an angled tubular conduit in which a piezoelectric transducer is glued or cemented which further possesses coupled rubber impact absorbers at the extremities of the tubular conduit. The angulation of the tubular conduit means that the flow is predominately incident on the area where the transducer is positioned, in order that electrical signals may be generated by it in response to the impact of particulate material.

The flow sensor described in the aforementioned document presents some drawbacks, among which we highlight the fact that the transducer is fixed solidly (glued or cemented) to the tubular conduit without any rear support in such a way that it vibrates together with the tubular conduit whereby it has a substantially reduced detection capacity. Such a deficiency requires that for satisfactory detection, it is necessary for the conduit to be angled so that the flow of seeds focuses predominately in the area of the transducer. However, such angulation has the disadvantage of leading to a loss of pneumatic pressure in the system, as well as favoring the deposition of material alongside the detection area of the sensor itself. These problems prejudice its function of flow detection in the presence of dust which is characteristic in the dosage of solid fertilizer or with dirt or chemical treatment commonly present in seeds. Furthermore, it comprises of only one transducer within the tube and therefore its isolation is a deficiency as it comprises only rubberized material without counting on a more specific format for more efficient noise isolation.

A simplified summary of the method described for the present invention will appear below, whereas this summary does not provide an extensive overview of all the methods contemplated herein. Furthermore, it is not intended to identify key or critical elements, nor outline the scope of the method. Its sole purpose is to present some of the concepts for the method described in a simplified manner, in such a way as to act as an introduction to the more detailed description that will be presented subsequently.

BRIEF SUMMARY

This invention refers to a robust low cost wireless sensor with an internal battery that permits operation for extended periods without the necessity of maintenance, for monitoring the flow of particulate solid material such as chemical fertilizers, small seeds, granulated foodstuffs, and others, used in equipment and/or machines of various sectors such as agriculture and livestock, foodstuffs, civil construction, plastics, etc., although mainly used to monitor the flow of fertilizers and seeds in agricultural machinery and that comprises of at least one electromechanical transducer placed against the face of a rigid resonant conductor.

The rigid conductor is connected to a sleeve of a conduit on an agricultural machine which guides the particulate material, whereas the sensor additionally comprises a protective coating which houses a circular support which fits to supports that secure the transducer to the external face of a rigid conductor, an electronic circuit board, and batteries which supply power to the flow sensor.

Optionally the rigid resonant conductor can be provided with vanes in order to maximize vibration that arises from collisions within the flow of material, further increasing sensitivity of the sensor.

A further option, for sensing flow generated by gravity, is that the sensor that is the subject of this invention can be installed with a flow diverter screen fixed externally to the conduit sleeve that conducts the fertilizer from the meter in order to bend the sleeve thereby causing a disturbance in the flow in such a way as to maximize the frequency and intensity of collisions between the flow of particulates and the wall of the rigid resonant conductor.

The main advantage of this invention is the use of passive electromechanical transducers which drastically minimize energy consumption which permits the sensor to be powered by smaller batteries installed within the sensor for long periods of time without requiring a recharge. As such wires are not required in order to provide a power supply to the sensor.

Another advantage of this invention is that the sensor sends its data by radiofrequency to a remote monitor to interface with the operator which completely eliminates the need for wires in the device, also eliminating installation difficulties and defects that arise from the routing of wires on apparatus.

Another advantage due to the use of an internal battery and as a consequence of being wireless is that the sensor does not need to be provided with cables and connectors with a high degree of protection which increases robustness and reduces the total cost of the product.

Another advantage due to the use of an internal battery is that the sensor does not need to be opened throughout its working life. This enables the use of simpler construction methods for closing-off such as ultrasonic welding thereby avoiding the use of screws and seals which increases robustness and reduces the total cost of the product.

Another advantage due to the use of an internal battery and as a consequence of the absence of wires is that of the freedom of positioning of the sensor on apparatus. For example, in pneumatic seeders, it is possible to install the sensor close to the soil increasing the speed in which clogging is sensed.

Another advantage of this invention is that of capturing the flow rate in a non-invasive manner, for instance, without interference, interruption or alteration in the direction of the flow of solid material.

Another advantage of this invention is to effect sensing without bias or the imposition of any tendency to effect the flow in any specific area of the conduit, in such a way as to minimize the deposition and/or crusting of particulate materials within the rigid conduit thereby increasing the efficiency of the flow sensor and reducing the need for cleaning and maintenance.

Another advantage of this invention is the ability to activate the flow sensor only when the agricultural machinery is being used in the field, thereby significantly reducing the consumption of energy, and, as a consequence, increasing the self-sufficiency of the sensor's battery.

Another advantage of this invention is that of isolating the rigid conductor from external vibrations caused by the apparatus, thereby avoiding any incorrect interpretation in relation to the flow of particulate material.

In order to achieve the preceding objectives and others, one or more methods comprise the aspects which will be described below and specifically defined in the claims. The following descriptions and designs as attached present certain illustrative details for aspects of the methods described. However, these aspects indicate only some of the various ways in which the principals of the various methods may be used. Besides which it is intended that the methods so described include all such aspects and their equivalents.

BRIEF DESCRIPTION OF THE DRAWINGS

The characteristics, nature and advantages of this invention will become more apparent from the detailed description as set out below when read together with the drawings where the same references refer to the same elements, in which:

FIG. 11—Shows a flowchart for the operating modes of the sensor and the transitions between the modes of operation.

DETAILED DESCRIPTION

This invention refers to a WIRELESS PARTICULATE SOLID MATERIAL FLOW SENSOR WITH INTERNAL BATTERY, that was specifically developed to monitor the flow of fertilizers and small seeds in agricultural machinery whereas the sensor for this invention may also be used in machines and/or equipment from various sectors of industry, such as for example, that of foodstuffs, civil construction, plastics, etc., for monitoring the flow of any particulate material.

Figure 1:
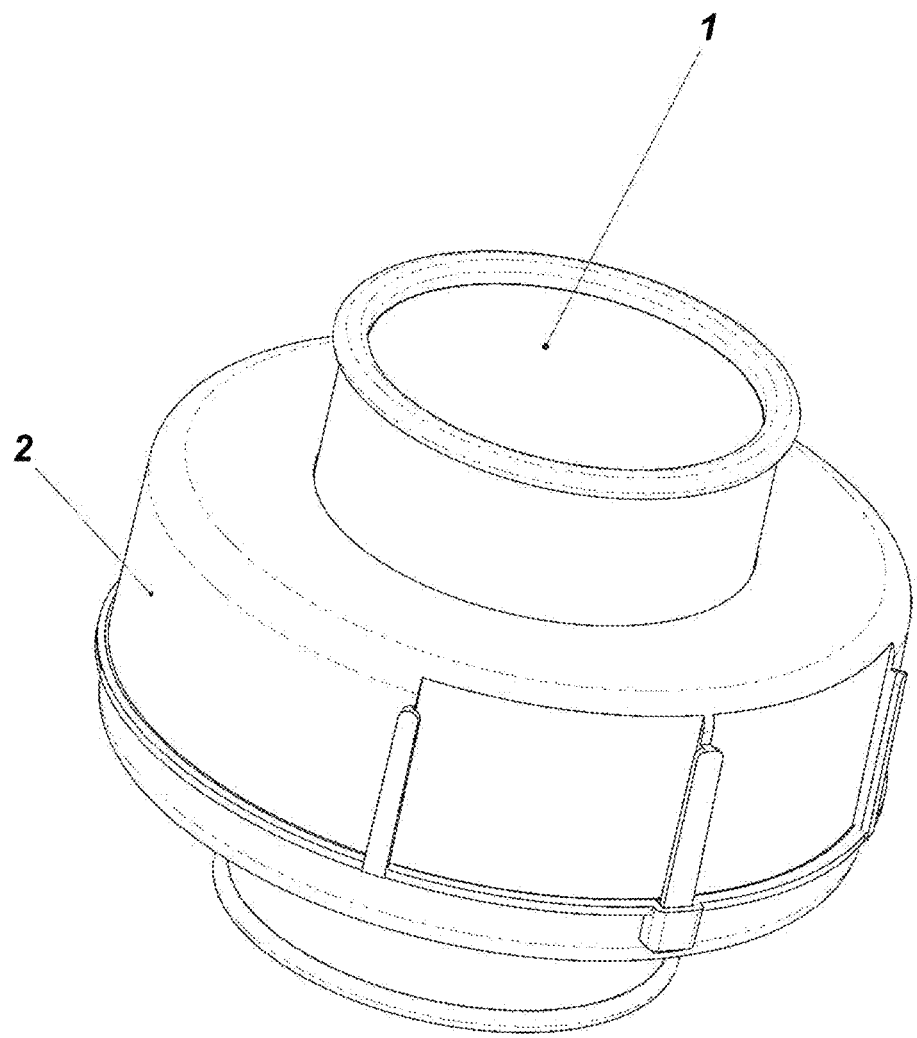
FIG. 1—Shows a view of the particulate solid material flow sensor, the subject of this invention.

Refer to FIG. 1 that shows the particulate solid material flow sensor which comprises of a rigid resonance conductor (1) covered by a circular protective shield (2).

Figure 2:
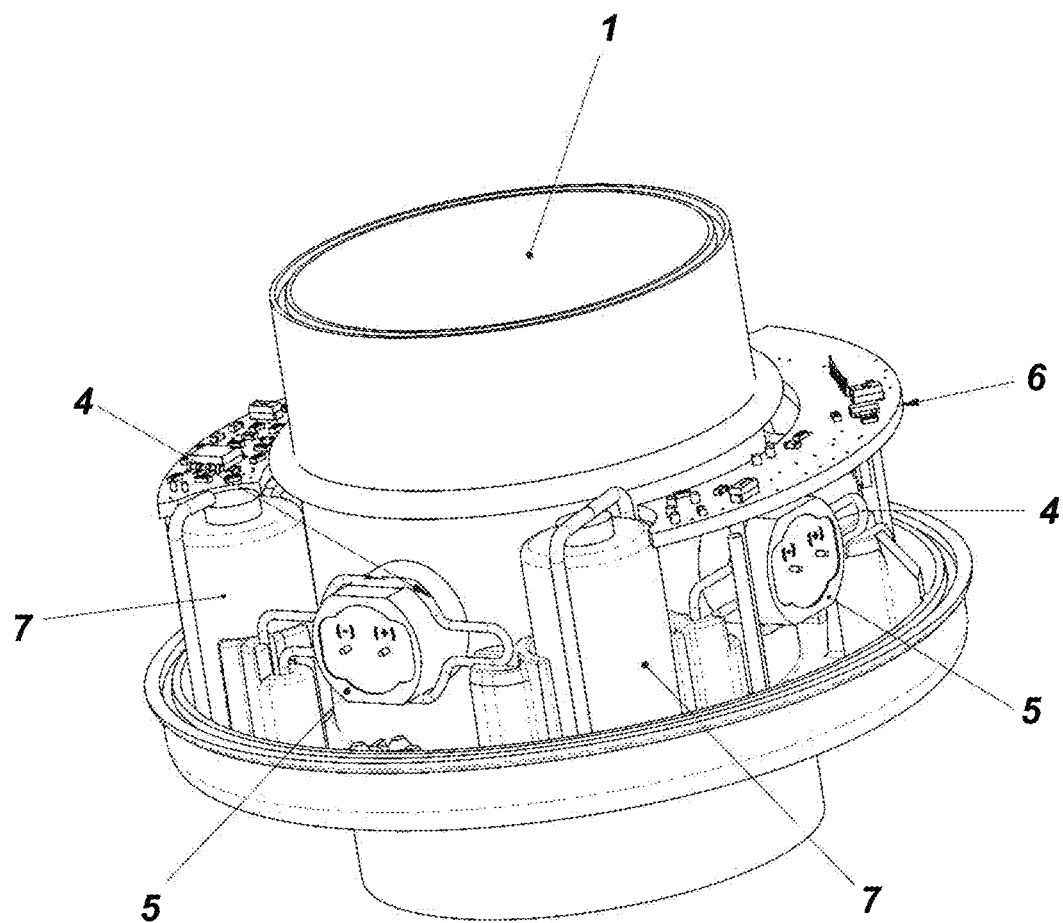
FIG. 2—Shows a view of the sensor from FIG. 1, without the protective coating.
Figure 3:
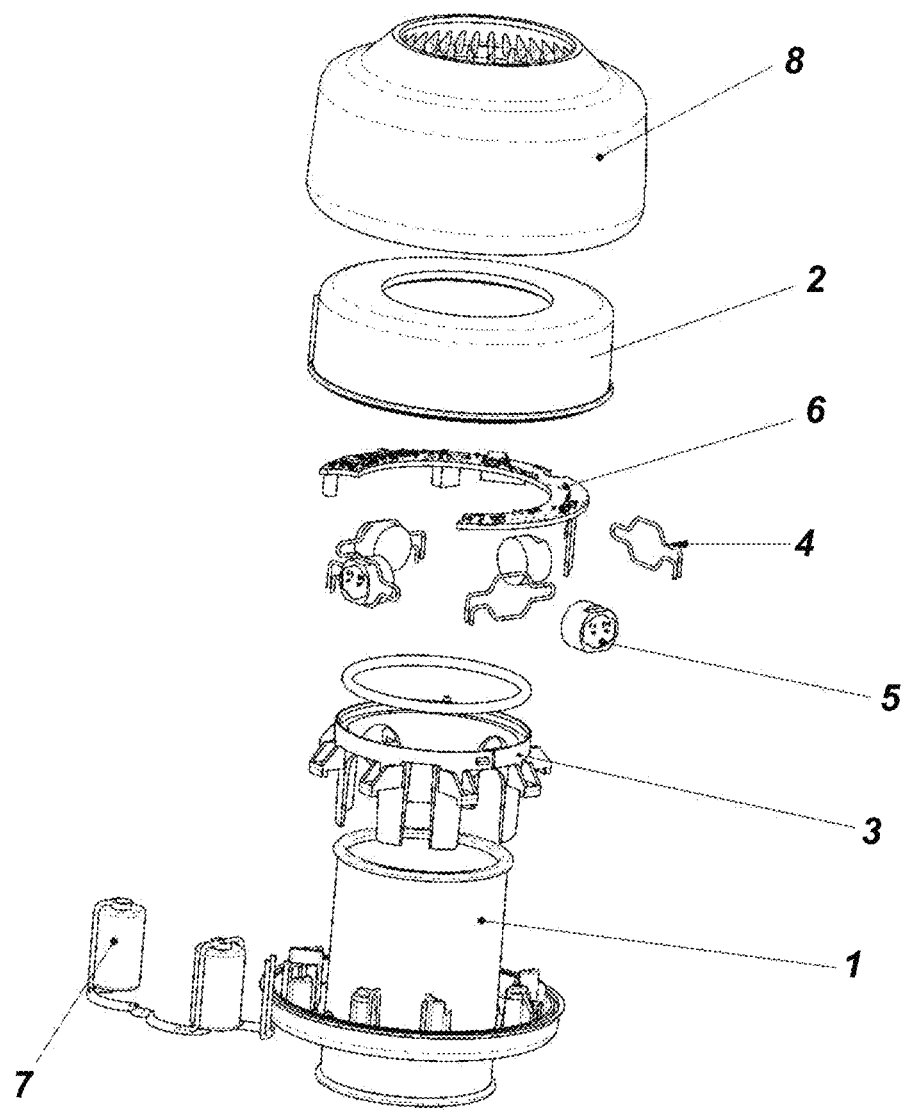
FIG. 3—Shows an exploded view of the particulate solid material flow sensor.
Figure 4:
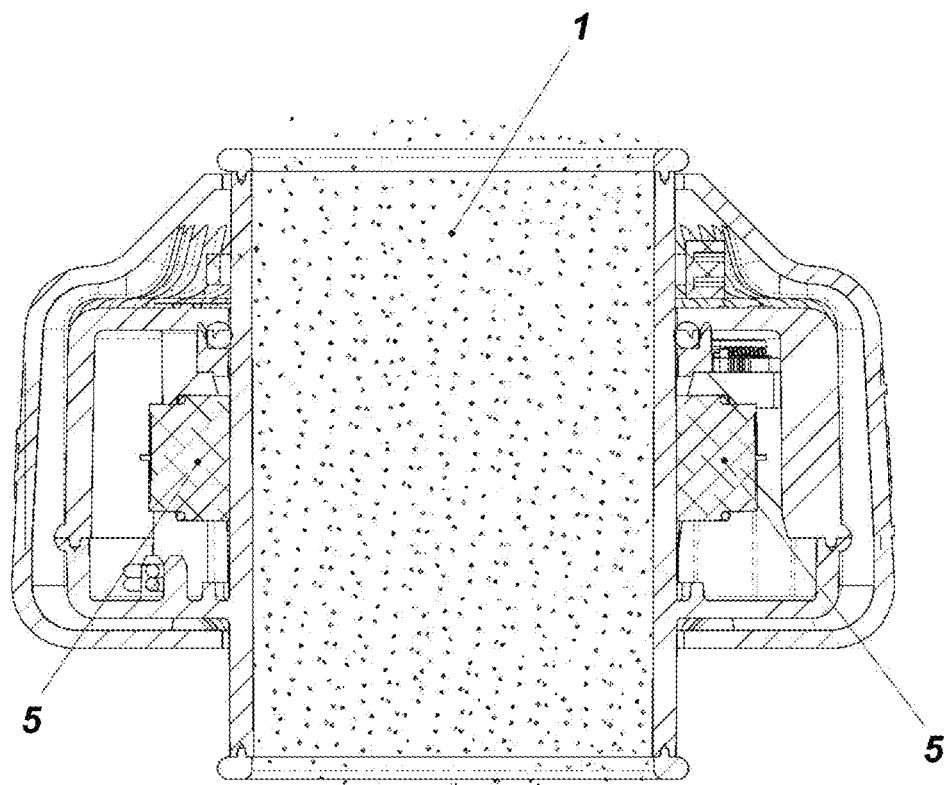
FIG. 4—Shows a side view in section of the particulate solid material flow sensor.
Figure 7:
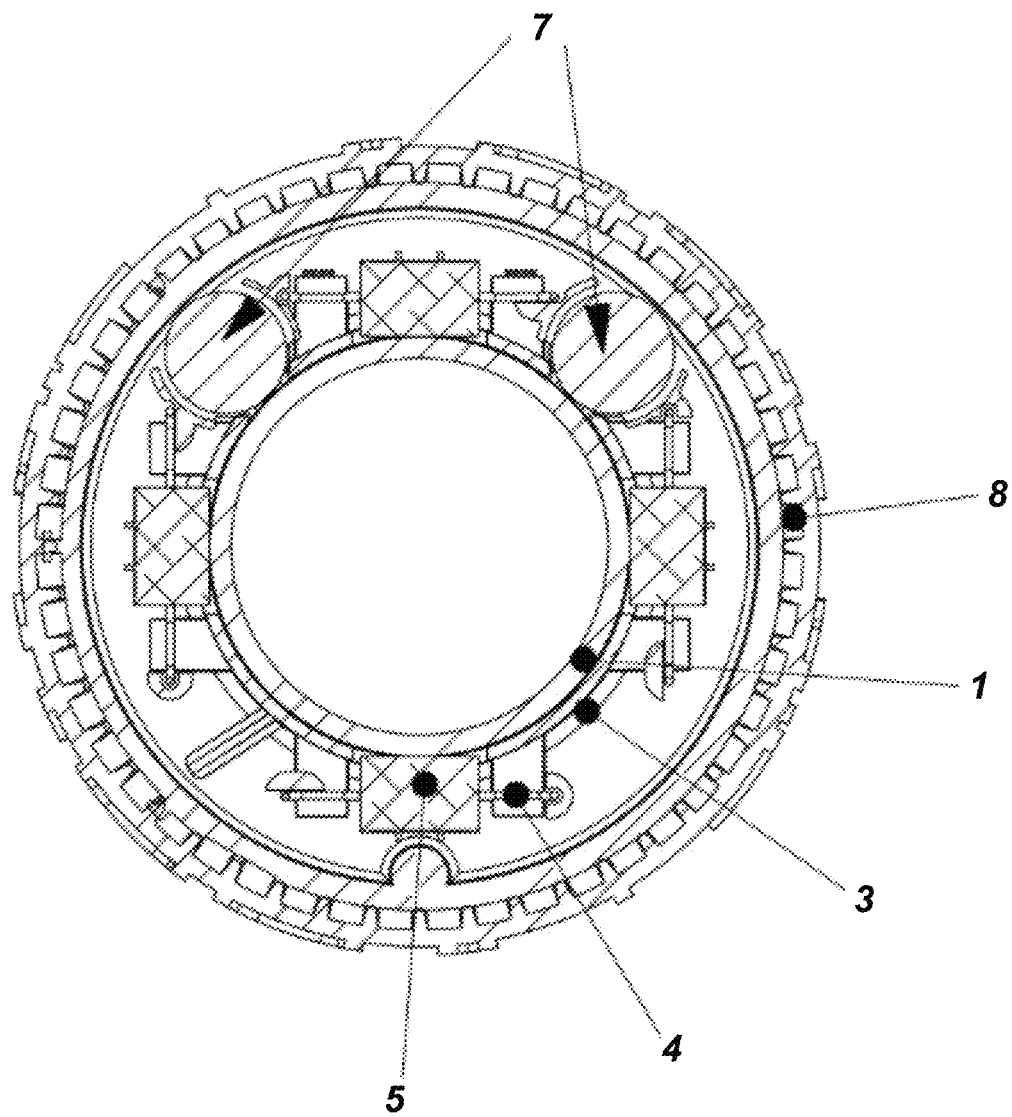
FIG. 7—Shows a top view in section of the particulate solid material flow sensor.

Refer to FIGS. 2, 3 and 7 that show the flow sensor for this invention in which the rigid resonance conductor (1) comprises of a circular support (3) which fits to supports (4) that secure the transducers (5) to the external face of a rigid conductor (1), which is further provided with an electronic circuit board (6), and batteries (7), enclosed in the circular support (3), all covered by a protective circular shield (2). Optionally the rigid conductor (1) can be covered by a rubber protective cover (8) with the function of isolating the rigid conductor (1) from external impacts and vibrations which may prejudice its proper functioning.

Figure 8:
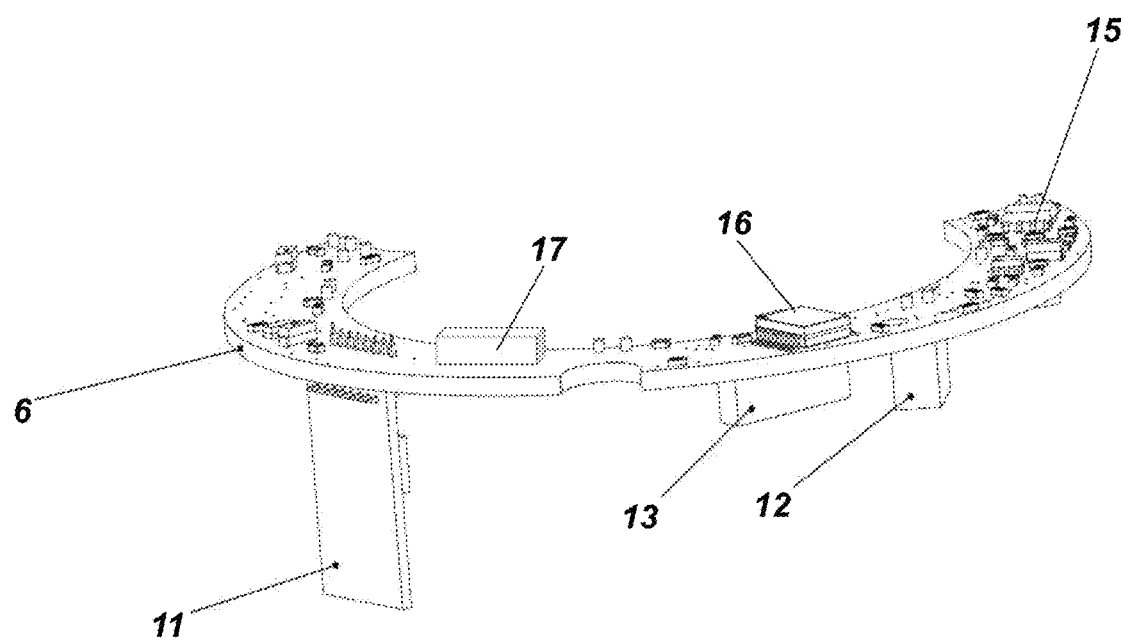
FIG. 8—Shows a detailed view of the electronic circuit board for the sensor with its respective components.

Refer to FIG. 8 that shows the electronic circuit board (6) where the radio frequency transceiver components are located (11), external impact sensor (17), microprocessor (16), maintenance indicator (13), power indicator (12) and the analogue adder circuit (15).

Figure 5:
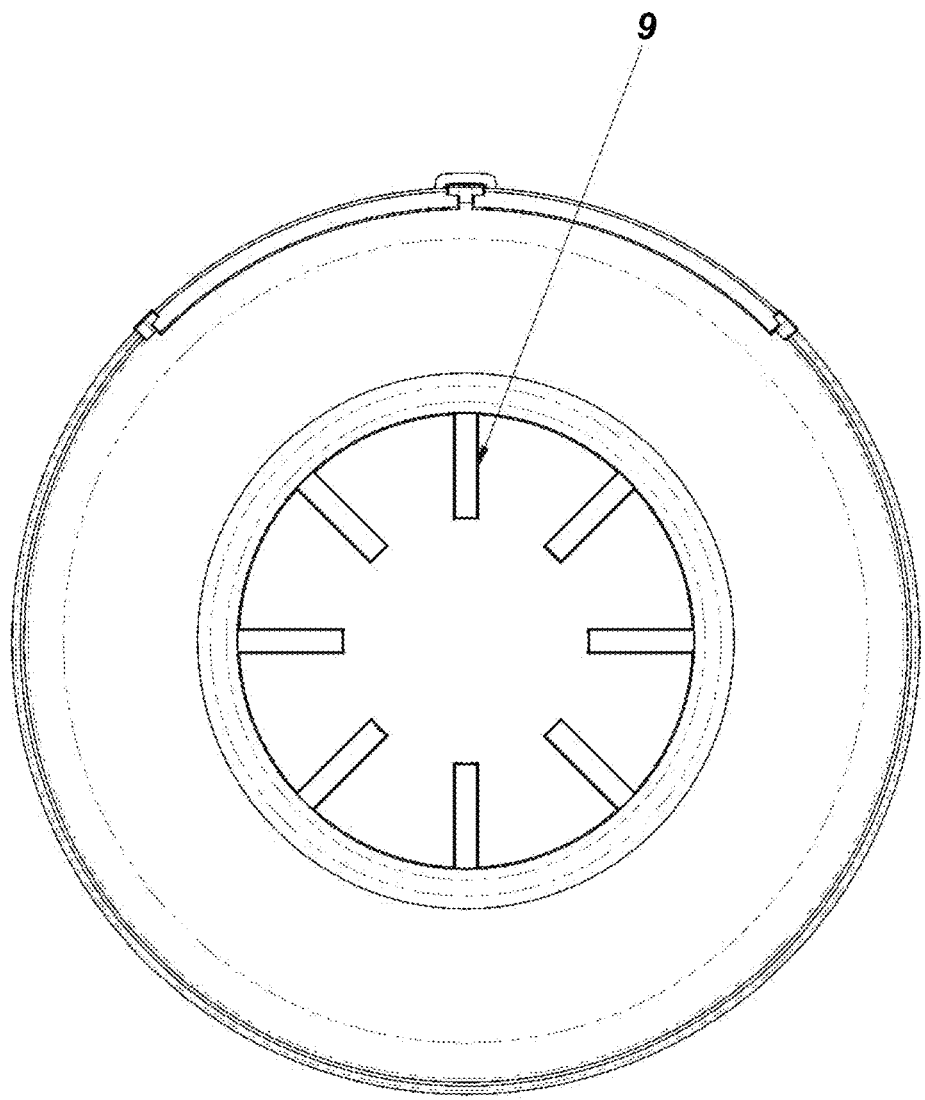
FIG. 5—Shows a top view of the particulate solid material flow sensor with optional vanes for the rigid conductor.

The rigid resonance conductor (1) has the ability to resonate, that is to say, vibrate mechanically in its natural frequency due to collisions of particulate material against its internal walls. The internal diameter of the rigid resonance conductor (1) is equal to the rest of the flow route, avoiding bottlenecks that interfere with the direction of flow. The conductor is straight, without curves, such that on its internal surface there is no area with a greater contact tendency with the particulate material, or by which incidence of the same would predominate, thus avoiding deposition of material, or that which affects the direction of flow. The length of the conductor should be sufficient so that collisions which occur over the length of its internal surface which result in vibrations at minimum amplitudes can be detected by the electromechanical transducers (5). The wall of the rigid resonance conductor (1) can be modified in accordance with its intended use and may receive a polish and/or specific treatment in order to minimize crusting of material in the form of dust which may be present, for example, in some types of fertilizers, or can be provided with the addition of vanes (9), as shown in FIG. 5, in order to maximize the incidence of collisions, increasing sensitivity of the flow sensor, where such interference with the flow is permissible.

Along the wall of the rigid resonance conductor are placed one or more electromechanical transducers (5). An equally spaced number of the transducers can be set-up for any diameter of the resonance conductor (1) in sufficient quantity to detect vibration about the transducer or even its entire external area. In the proposed constructive arrangement 4 (four) transducers have been illustrated (5) arranged perpendicularly to one another in order to form a "transduction belt", in order to provide high sensitivity for any operating position of the flow sensor. These transducers have the ability to capture vibrations or mechanical deformation of the rigid resonance conductor (1), and transform such into an electrical analogue signal proportional to the vibration or deformation captured, demanding little or no external power in order to function.

The transducer can be either active or passive and can include a piezoelectric, magnetic, electromagnetic, microphone, strain gauge, or electroactive polymer element or any similar device with the capacity to effect electromechanical transduction with low energy consumption. Preferably the transducers (5) should have good directionality which results in increased sensitivity along the length of the conductor and reduced sensitivity to external vibration or even noise. Its placement along the rigid resonance conductor (1) can be achieved via the use of adhesive, fitting or by means of supports (4). In the proposed constructive arrangement passive piezoelectric transducers are shown which do not need external power in order to function and that are also immune to external sound vibrations. Its positioning along the conductor was achieved by means of supports (4), described as follows.

Supports (4) position the transducers (5) along the external wall of the rigid resonance conductor (1), and have the purpose of applying sufficient and necessary force to the transducer in order to maximize the capture of vibrations. They can be made of metallic wire springs or flat plates, plastic springs, or any plastic, metal or rubber device that achieves the same function. Excessive force from the support (4) applied to the transducer (5) results in the dampening of vibration for the system and too weak a force results in low mechanical power transmission. In the proposed constructive arrangement metallic wire springs have been used the force of which was empirically determined due to increased sensitivity achieved throughout the tests. The use of supports (4) significantly increases the sensitivity of the transducer (5) which enables the use of a smooth and straight resonance conductor (1).

The electronic circuit board (6) comprises an electronic adder circuit (15), a microprocessor (16), radiofrequency transceiver (11), an external impact sensor (17), a maintenance indicator (13), and a power indicator (12).

The radiofrequency transceiver (11) effects wireless communication between the flow sensor and the remote monitor (18) which displays to the operator of the agricultural equipment the flow rate of particulate material within the rigid resonance conductor (1).

The electronic adder circuit (15) has the purpose of summating the analogue signal generated by the transducers (5) and sends the resultant signal to the microprocessor (16).

The external impact sensor (17) has the ability to detect external impacts and vibrations that could contaminate flow detection. This sensor may be digital, microelectromechanical (MEMs) or electromagnetic; and of the accelerometer, force sensor, pressure sensor or any other type which has a similar function. In the proposed constructive arrangement a low power consumption SMD (surface mounted device) digital accelerometer was used which immediately sends a digital signal to the microprocessor (16) each time that an impact of high frequency and amplitude is detected.

The power indicator (12) has the ability to tell the microprocessor (16) when the sensor is potentially in use. Various known components exist that have the ability to execute this function, such as mechanical "tilt sensors", magnetic sensors, accelerometers, MEMs type integrated circuits for the measurement of inclination or acceleration, RTC (real time clock) components, and other timers that are able to set periods, dates and times of function, switches and buttons triggered by the user, or even flow detection transducers that tell the microprocessor (16) when there is a flow passing through the sensor. In the proposed constructive arrangement a mechanical "tilt sensor" was used which creates a disturbance at the processor input point whenever movement is detected. In this manner the processor is always notified when the apparatus is set in motion, as such is a potential sensor use situation.

The maintenance indicator (13) has the ability to tell the microprocessor (16) that the sensor should switch into maintenance mode. In this event the microprocessor will configure the radiofrequency transceiver on a pre-determined channel set for communication with maintenance equipment. Subsequently such equipment can then alter the network address of the sensor, its sensitivity, or any other relevant functional parameter. Various known components exist that have the ability to execute this function, such as mechanical "tilt sensors", magnetic sensors, accelerometers, or even switches and buttons triggered by the user. In the proposed constructive arrangement a "reed switch" type magnetic sensor was used in order that the sensor may enter into maintenance mode whenever a magnet approaches a specific area of the sensor.

The microprocessor (16) is of the "ultra-low power" type with power saving functions which is freely available on the market from various manufacturers for the sector. It receives signals sent by the transducers (5) by way of the adder circuit (15) and is provided with bundled software for signal processing and as a consequence able to evaluate the presence, absence and amount of flow within the rigid resonance conductor (1), also taking into account the signal generated by the external impact sensor (17) in order to avoid contamination in evaluation of the flow signal.

The microprocessor (16) also has the role of implementing the various functional modes as shown in FIG. 11, thereby effecting transitions between the modes in accordance with information received by the processor. For the majority of time the sensor will be in "SLEEP" mode where its power consumption will be extremely low, as a consequence it will turn off unnecessary electronic circuits and the microprocessor (16) will operate in power saving mode. In the event that a signal is emitted by the maintenance indicator (13) the sensor enters into maintenance mode (MANUT) as described above and returns to "SLEEP" mode after a pre-determined interval. In the event that, in "SLEEP" mode, a signal is emitted from the power indicator (12), the sensor enters into "RF" mode elevating power consumption due to the sensor trying to communicate with the remote monitor (18). In the event that the monitor is turned on which indicates that the operator is present, the sensor receives a response and enters into full operation mode (FUNC) with an intermediate level of power consumption. Where no return signal is received the sensor returns to "SLEEP" mode. When in full operation mode (FUNC), the sensor will switch over to "RF" mode for pre-determined periods of time, just to confirm its presence within the apparatus, and in case of a change in flow, when it will communicate the new reading to the remote monitor. While still in "FUNC" mode the sensor will switch to "SLEEP" mode in the event that no flow is detected for a long period of time meaning that, even with the operator present, the machine is not in full operation.

These different modes of operation and their switching mechanisms ensure that the sensor will be in a state of extremely low power consumption most of the time—which would mean the majority of the year in the case of agricultural equipment—and that it would therefore consume power for communications only when strictly necessary. As such, it achieves an energy reduction to the lowest possible level for battery consumption, increasing its working life.

The batteries (7) are meant to supply power to the flow sensor and may be of the primary type with enough power to supply the flow sensor throughout its working life or of the rechargeable type which receives an external charge for a determined period of use. Various manufacturing technologies and chemical elements both current and future can be used to reduce the size of batteries, as well as to augment their volumetric energy density. In the proposed constructive arrangement 2 (two) primary Lithium Cylindrical batteries have been used.

Figure 6:
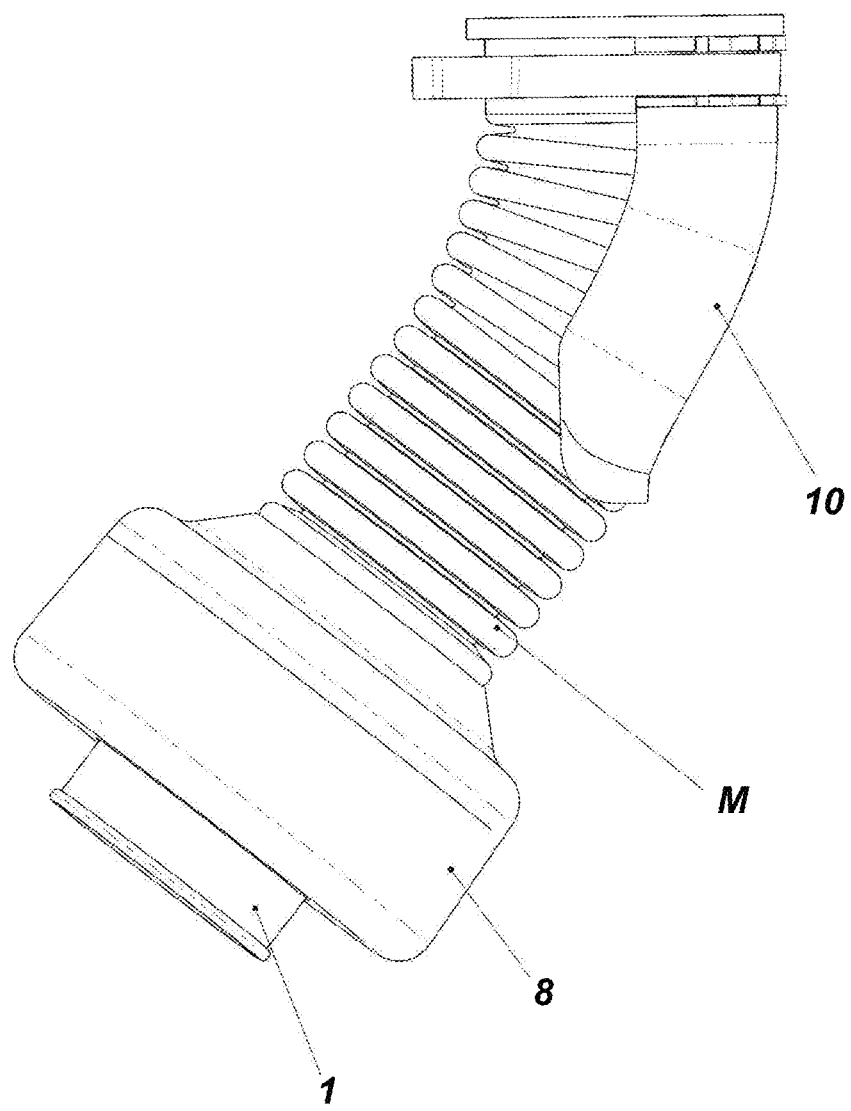
FIG. 6—Shows a view of the flow sensor connected to a sleeve of an agricultural machine conduit.

Refer to FIG. 6 that shows a view of the flow sensor connected to the sleeve (M) of a conduit from an agricultural machine that guides particulate material. As illustrated a flow diverter screen (10) is installed externally to a sleeve (M) of the conduit together with a rigid connector (1). This assembly ensures that the particulate material always collides with the sleeve and is dispersed in various directions thereby guaranteeing higher frequency and intensity collisions between the particles in flow and the wall of the rigid resonance conductor (1). This type of set-up was shown to be extremely efficient in gravity flow equipment where flow velocity is low in the proximity of the particulate material meter which could reduce sensitivity of the sensor. Such an assembly has the advantage of producing the desired flow diversion without causing deposition of material and crusting since its own folding movement (stretching and relaxing) of the sleeve is responsible for expelling any material deposited on the sensor.

The rubber protective cover (8) has the ability to protect the sensor against impacts and external vibration. It is made from rubber of sufficient durability to provide strength for the assembly whilst maintaining a degree of softness to isolate and absorb external vibrations and impacts. Additionally, the rubber cap (8) is provided with internal ridges that form pockets of air and reduce the contact area between the cap and the sensor in such a manner that maximizes protection and provides acoustic isolation.

Figure 9:
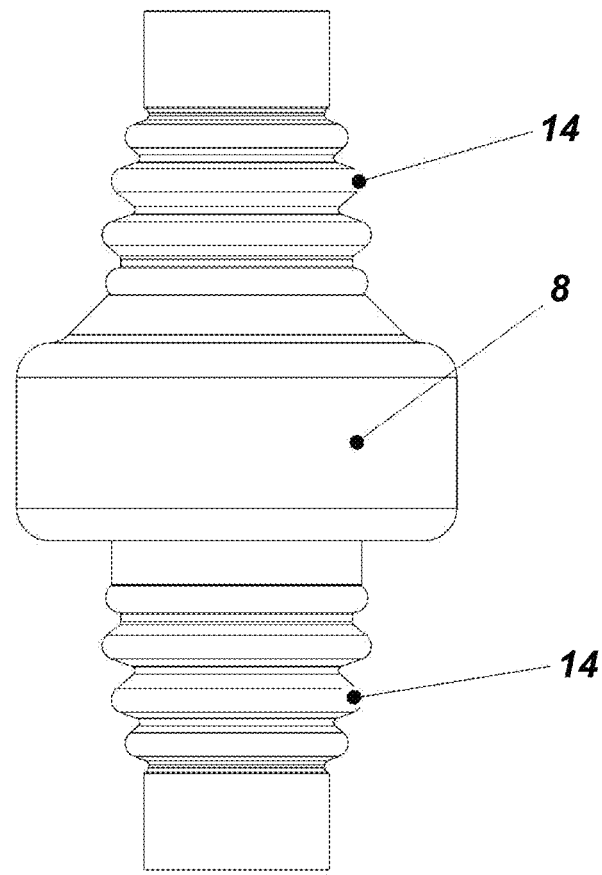
FIG. 9—Shows a sensor assembly with folding couplings.
Figure 10:
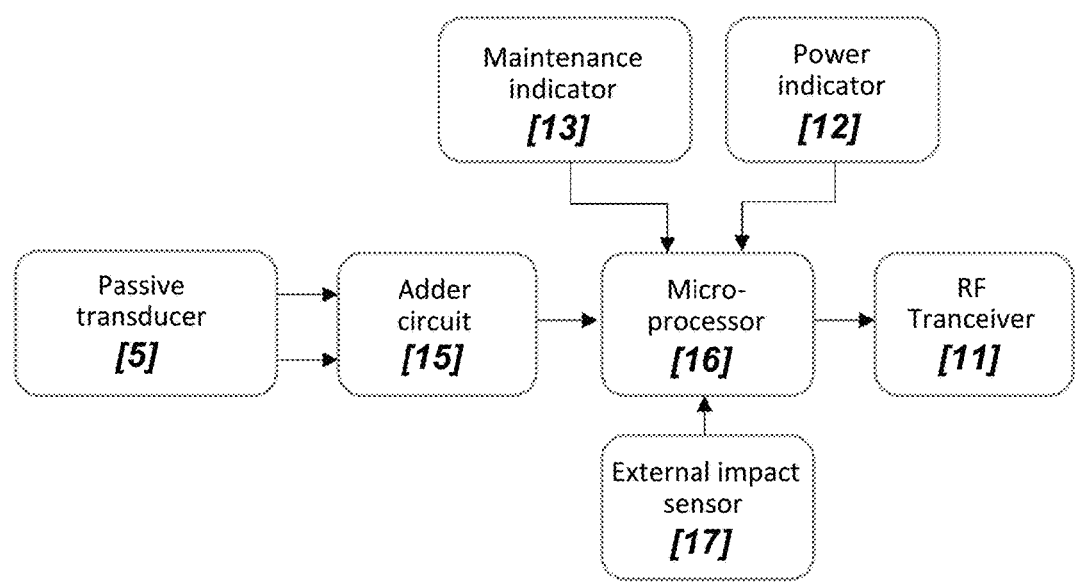
FIG. 10—Shows a block diagram of data flow involved in the functioning of the sensor.

FIG. 9 shows the sensor mounted with a pair of folding couplings (14) at its extremity. These couplings have the purpose of isolating vibrations when the sensor is mounted on rigid tubes. As such, it impedes structural vibrations from equipment reaching the rigid resonance conductor (1) which otherwise may compromise flow readings. These couplings may be used with any type of equipment with good acoustic isolation, such as rubber, cork, cardboard and others.

Figure 12:
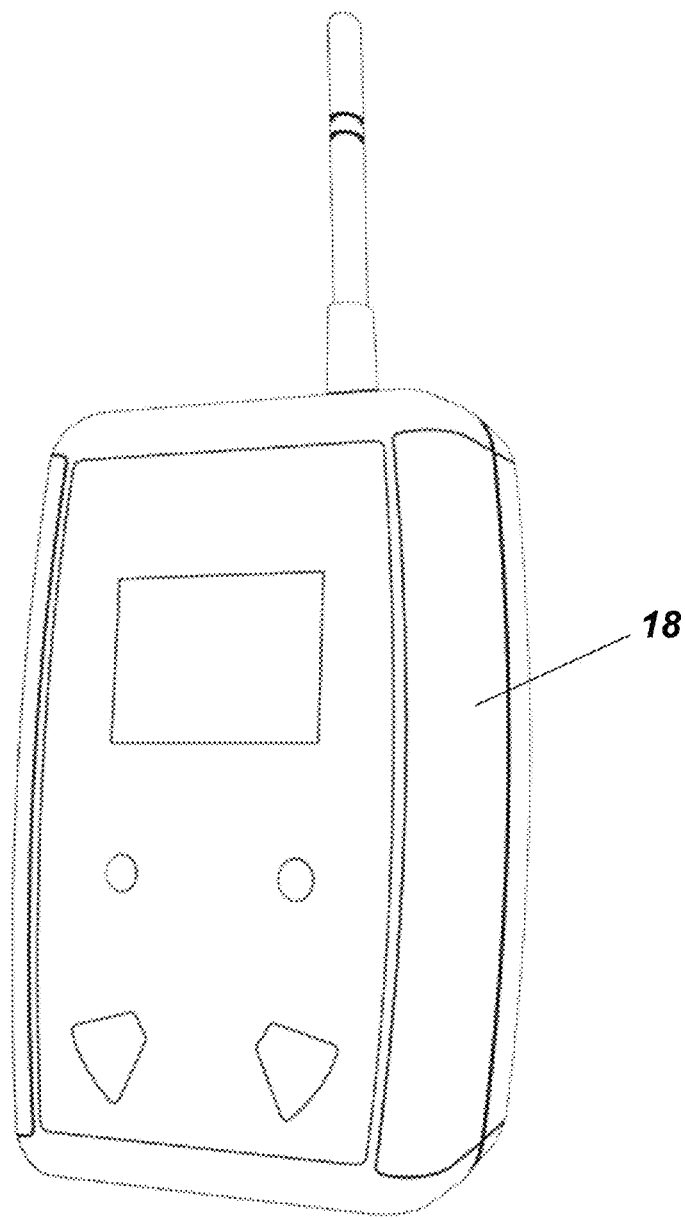
FIG. 12—Shows a perspective view of the remote wireless monitor.

Refer to FIG. 12 that shows the wireless remote monitor (18) which provides information to the operator from one or more sensors present in the machine and/or equipment which emits an audio and/or visual alarm whenever an abnormality is detected. The remote monitor is provided with a high power radiofrequency transceiver in order to ensure increased strength for the wireless communication link.

Additionally, the remote monitor (18) has the ability to infer that an agricultural machine is in motion when there are no seeds or other inputs in flow which avoids unnecessary alarms that may cause discomfort for the operator during maneuvering. The alteration or inhibiting of alarms occurs when a configurable number of sensors notify an absence of flow. For improved performance this information can also be allied to velocity information for the equipment supplied via GPS or any other displacement sensor, such as wheel sensors, encoders, radar and others.

It should be emphasized that operation of the sensor described for this invention is suitable for any type of particulate material flow generation whether by mechanical action, gravity, pneumatic pressure, or any other type which enables the collision of solid particles with the walls of the sensor.

It will be easily understood by those versed in the technique that modifications can be made to the invention without such moving away from the concepts set out in the foregoing description. Such modifications should be considered to fall within the scope of the invention. Consequently the particular methods described in detail above are merely illustrative and are not limitative as to the scope of the invention to which should be given full extent under the claims appended and any and all equivalents to the same.

What is claimed is:

1. A wireless particulate solid material flow sensor with an internal battery, comprising:
   a rigid resonance conductor having an internal volume through which a particulate solid material flows, the rigid resonance conductor including a circular support and transducer supports coupled to the circular support, the transducer supports applying pressure to respective transducers against an exterior wall of the rigid resonance conductor; and
   an electronic circuit board including a maintenance indicator, a power indicator, a microprocessor, a radiofrequency transceiver, and the internal battery.

2. The particulate solid material flow sensor of claim 1, wherein the transducer supports comprise at least one of metallic wire springs, flat plates, plastic springs, or rubber plates or springs.

3. The particulate solid material flow sensor of claim 1, wherein the transducers are either of the active or passive type and include a piezoelectric, magnetic, electromagnetic, microphone, strain gauge, or electroactive polymer element.

4. The particulate solid material flow sensor of claim 1, wherein the transducers are equally spaced around the rigid resonance conductor or along its external surface area.

5. The particulate solid material flow sensor of claim 1, wherein the transducers are coupled to the rigid resonance conductor by an adhesive or by a press-fit.

6. The particulate solid material flow sensor of claim 1, wherein the radiofrequency transceiver is configured to transmit the flow rate of particulate material within the rigid resonance conductor to a remote monitor.

7. The particulate solid material flow sensor of claim 1, wherein the maintenance indicator comprises a mechanical tilt sensor, magnetic sensors, accelerometers, or switches or buttons triggered by a user, wherein activation of the maintenance indicator switches the particulate solid material flow sensor into or out of a maintenance mode.

8. The particulate solid material flow sensor of claim 1, wherein the power indicator comprises a tilt sensor, magnetic sensors, accelerometers, microelectromechanical (MEMS)-type integrated circuits for the measurement of inclination or acceleration, RTC (real time clock) components, a timer, switches or buttons triggered by a user, or flow detection transducers.

9. The particulate solid material flow sensor of claim 1, wherein the microprocessor is configured to reduce power consumption when in a non-operating mode.

10. The particulate solid material flow sensor of claim 1, wherein the external impact sensor is a digital microelectromechanical (MEMS) sensor, a digital electromechanical sensor, an accelerometer-type force sensor, or an accelerometer-type pressure sensor.

11. The particulate solid material flow sensor of claim 1, wherein the internal batteries are of a primary type or a rechargeable type.

12. The particulate solid material flow sensor of claim 1, wherein the rubber protective cover comprises internal ridges.

13. The particulate solid material flow sensor of claim 1, further comprising vanes arranged internally to the rigid resonance conductor wall.

14. The particulate solid material flow sensor of claim 1, further comprising a flow diverter plate installed externally to a sleeve of an agricultural machine conduit together with the rigid resonance conductor.

15. The particulate solid material flow sensor of claim 1, wherein the folding couplings comprise an acoustically isolating material.

16. The particulate solid material flow sensor of claim 1, wherein the sensor is configured to be kept in a state of very low power consumption until the maintenance indicator is triggered, and then the sensor is configured to turn into a maintenance state, communicating via a specific radiofrequency channel with maintenance equipment.

17. The particulate solid material flow sensor of claim 1, wherein the sensor is configured to remain in a low power consumption state until the power indicator is triggered, then the sensor is configured to communicate with a remote monitor, switching to a full operation mode when receiving a response communication or returning to low power consumption when no response is received.

18. The particulate solid material flow sensor of claim 17, wherein the sensor, when in full operation mode, is configured to communicate with the remote monitor only for predetermined time intervals or when there are changes in flow measurement, and wherein the sensor is further configured to switch to low power consumption when there is an absence of flow for an extended time period.

19. A particulate solid material flow sensor system, comprising:
   at least one particulate solid material flow sensor of claim 1; and
   a remote monitor that inhibits or alters the emission of an audio and/or visual alarm when a configurable number of particulate solid material flow sensors notify the remote monitor of an absence of flow.

20. A method for operating the particulate solid material flow sensor of claim 1, comprising:
   maintaining the particulate solid material flow sensor in a sleeping mode until it is triggered by the maintenance indicator;
   turning the particulate solid material flow sensor into a maintenance mode in response to being triggered by the maintenance indicator;
   when the particulate solid material flow sensor is in the maintenance mode, communicating with maintenance equipment via a specific radiofrequency channel; and
   returning the particulate solid material flow sensor to a sleeping mode after a pre-determined time.

21. A method for operating the particulate solid material flow sensor of claim 1, comprising:
   maintaining the particulate solid material flow sensor in a sleeping mode until the particulate solid material flow sensor is triggered by the power indicator;
   responsive to triggering by the power indicator, communicating with a remote monitor;
   switching to full operation mode when a response communication is received from the remote monitor; and
   returning to sleep mode when no response is received from the remote monitor.

22. A method for operating the particulate solid material flow sensor of claim 1, comprising:
   during full operation mode:
   communicating with the remote monitor at predetermined time intervals and when there are changes in flow measurement; and
   switching to sleep mode when there is an absence of flow for an extended time period.

23. A method for operating a plurality of particulate solid material flow sensors of claim 1, comprising:
    communicating with a plurality of the particulate solid material flow sensors with a remote monitor; and
    when a configurable number of the particulate solid material flow sensors notify the remote monitor of an absence of flow, inhibiting or altering the emission of an audio and/or visual alarm.

* * * * *